United States Patent
Nomura et al.

(10) Patent No.: US 7,400,109 B2
(45) Date of Patent: Jul. 15, 2008

(54) INVERTER CIRCUIT AND COMPRESSOR

(75) Inventors: Shinichiro Nomura, Osaka (JP);
Hideharu Ogahara, Kanagawa (JP);
Katsumi Endo, Kanagawa (JP);
Shigetomi Tokunaga, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 279 days.

(21) Appl. No.: 10/558,508

(22) PCT Filed: Apr. 12, 2005

(86) PCT No.: PCT/JP2005/007362

§ 371 (c)(1),
(2), (4) Date: Nov. 28, 2005

(87) PCT Pub. No.: WO2006/006288

PCT Pub. Date: Jan. 19, 2006

(65) Prior Publication Data

US 2007/0052382 A1 Mar. 8, 2007

(30) Foreign Application Priority Data

Jul. 9, 2004 (JP) ............................. 2004-202873

(51) Int. Cl.
*H02P 27/00* (2006.01)
(52) U.S. Cl. ..................................... 318/801; 318/807
(58) Field of Classification Search ................ 318/801, 318/807
See application file for complete search history.

(56) References Cited

U.S. PATENT DOCUMENTS

| 4,366,533 | A | * | 12/1982 | Kohata et al. | ................ 363/136 |
| 4,367,521 | A | * | 1/1983 | Kohata et al. | ................ 363/136 |
| 4,472,671 | A | * | 9/1984 | Shapiro | ...................... 318/811 |
| 5,023,531 | A | * | 6/1991 | Altemose et al. | ............ 317/471 |
| 5,296,789 | A | * | 3/1994 | Ohi | ............................. 318/254 |
| 5,731,674 | A |   | 3/1998 | Jeske | |
| 5,744,927 | A | * | 4/1998 | Hayashida | .................. 318/599 |
| 6,064,163 | A |   | 5/2000 | Yoshida et al. | |
| 6,140,795 | A | * | 10/2000 | Cummins | ................... 318/815 |
| 6,220,045 | B1 | * | 4/2001 | Kim | ......................... 62/228.4 |
| 6,617,819 | B2 | * | 9/2003 | Dohmae et al. | ............. 318/599 |
| 6,710,564 | B2 | * | 3/2004 | Shibuya et al. | ......... 318/400.22 |
| 6,831,431 | B1 | * | 12/2004 | Dieterle et al. | .............. 318/268 |

(Continued)

FOREIGN PATENT DOCUMENTS

DE 33 18 784 A1 11/1984

(Continued)

OTHER PUBLICATIONS

International Search Report for application No. PCT/JP2005/007362 dated Aug. 24, 2005.

*Primary Examiner*—Rita Leykin
(74) *Attorney, Agent, or Firm*—RatnerPrestia (57) ABSTRACT

An inverter circuit includes a temperature measuring section for measuring a temperature of switching elements forming a powering section, a motor speed detector for detecting a speed of a motor, a carrier frequency determiner for determining a carrier frequency based on a temperature of the switching elements and a speed of the motor, and an output waveform determining circuit for determining a duty in response to a load applied to the motor and for switching a carrier frequency.

9 Claims, 10 Drawing Sheets

U.S. PATENT DOCUMENTS

7,023,152 B2 * 4/2006 Sunaga et al. .................. 318/34

FOREIGN PATENT DOCUMENTS

| | | |
|---|---|---|
| DE | 41 16 254 A1 | 11/1991 |
| EP | 0 081 891 A1 | 6/1983 |
| EP | 0 413 966 A2 | 2/1991 |
| EP | 1 383 232 A2 | 1/2004 |
| JP | 05-227793 | 9/1993 |
| JP | 09-140155 | 5/1997 |
| JP | 11-69867 A | 3/1999 |

* cited by examiner

INVERTER CIRCUIT AND COMPRESSOR

TECHNICAL FIELD

The present invention relates to an inverter circuit that drives a motor with switching elements controlled by the PWM control, which inverter circuit is suited for driving a hermetic compressor used in refrigerators.

BACKGROUND ART

Figure 12:
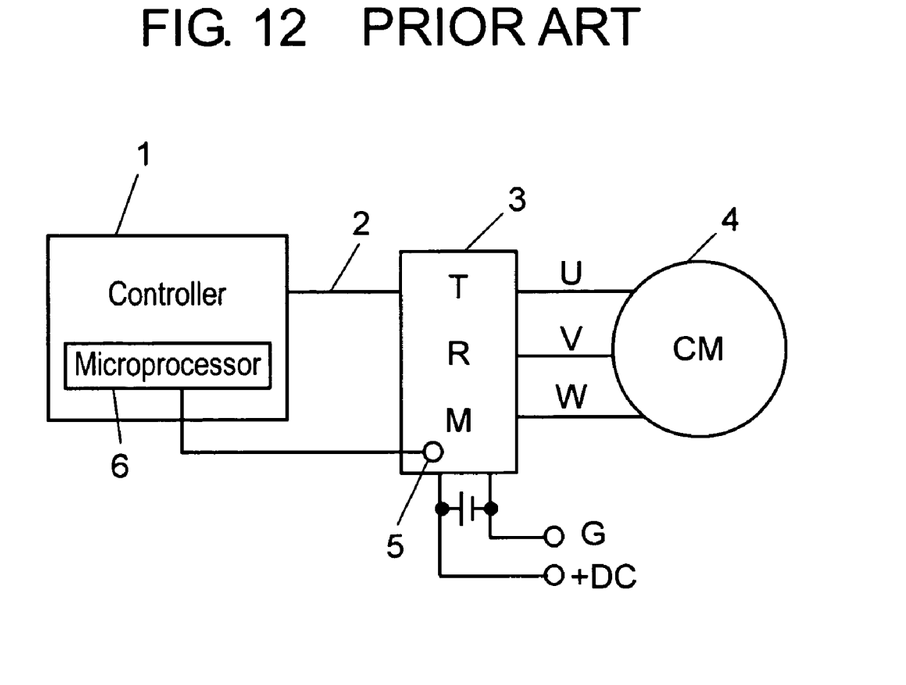
FIG. 12 shows a circuit diagram of a conventional inverter.

FIG. 12 shows a first example of conventional inverter circuits. This example is disclosed in Japanese Patent Unexamined Publication No. H09-140155. Transistor module (TRM) 3 drives motor 4 following PWM signal 2 supplied from controller 1. Temperature transducer 5 is disposed near TRM 3.

Figure 13:
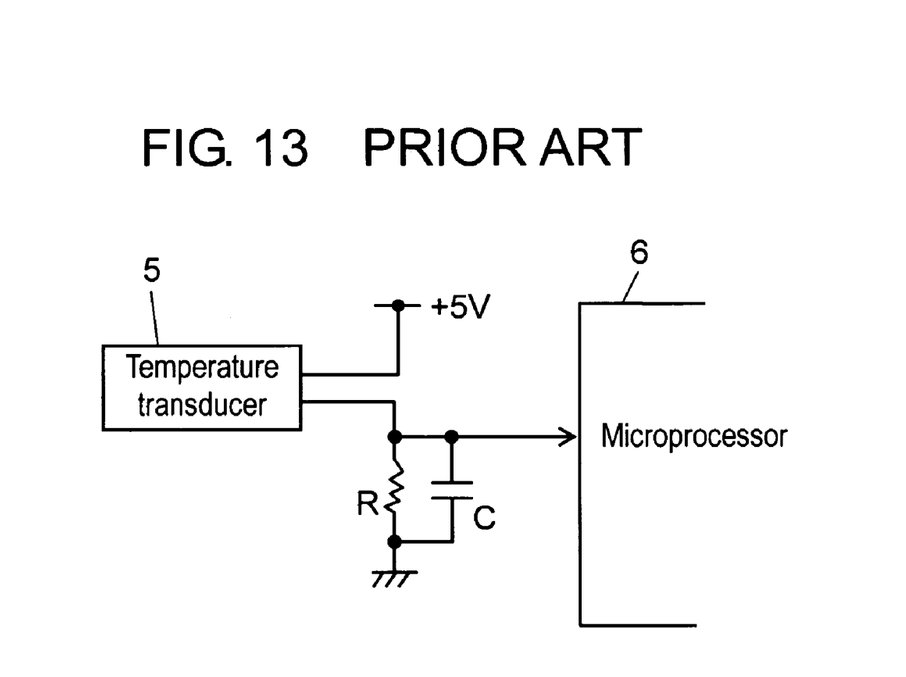
FIG. 13 shows a circuit diagram of a temperature transducer placed in the inverter circuit shown in FIG. 12.

As shown in FIG. 13, microprocessor 6 in controller 1 receives data from temperature transducer 5, and controls TRM 3 for preventing thermal breakdown.

Figure 14:
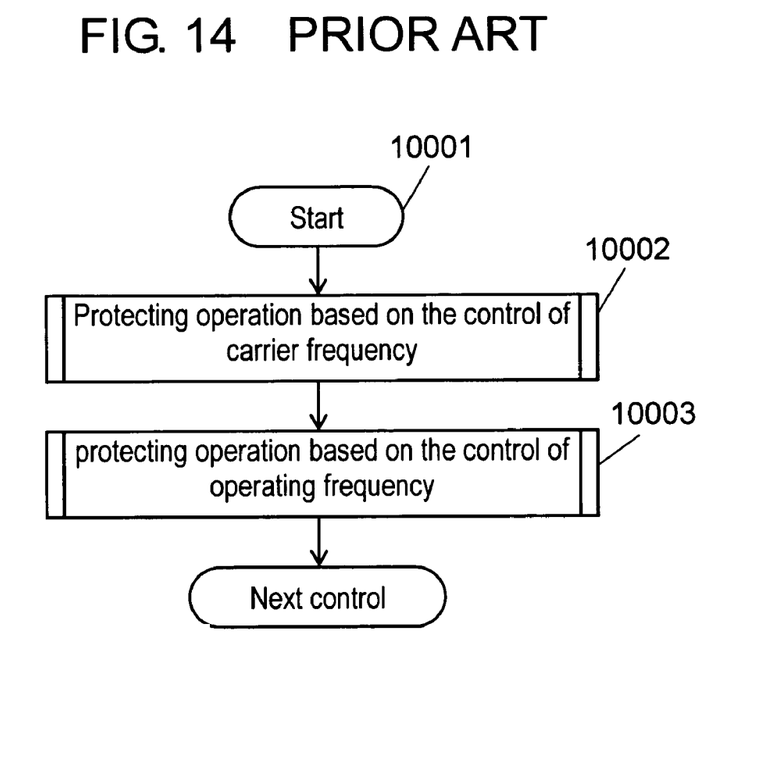
FIG. 14 shows a flowchart illustrating a protecting operation of the inverter circuit shown in FIG. 12.

FIG. 14 illustrates control over TRM 3.

Step 10001: start

Step 10002: When a rate of temperature rise (a temperature rise per unit time; ° C./second) detected by temperature transducer 5 exceeds a given value, a carrier frequency is lowered, thereby decreasing switching loss of TRM 3 for suppressing a temperature rise of TRM 3. When the rate of temperature rise lowers to not higher than the given value, the carrier frequency is restored.

Step 10003: If the rate of temperature rise does not lower to not higher than the given value although the carrier frequency is lowered, an operating frequency of motor 4 is lowered, so that the temperature rise of TRM 3 is suppressed.

Figure 15:
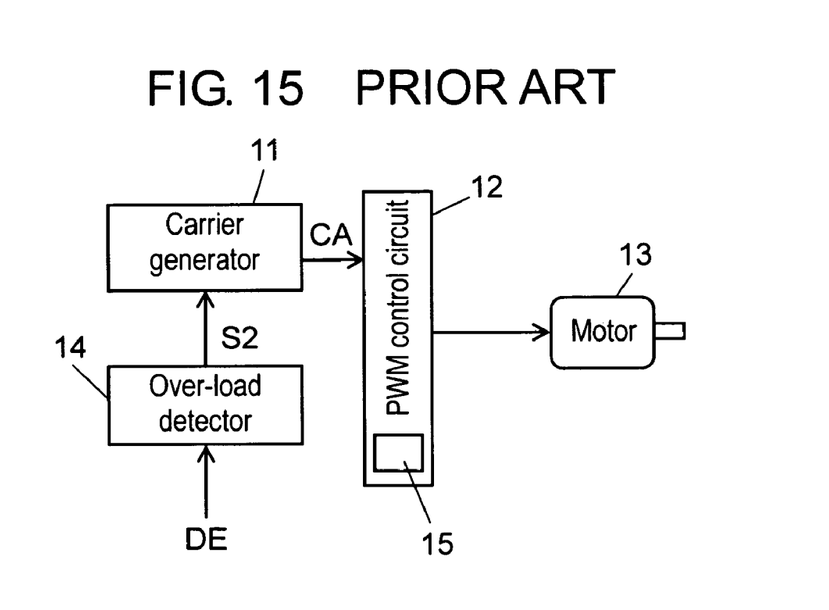
FIG. 15 shows a circuit diagram of another conventional inverter.

FIG. 15 shows a second example of conventional inverter circuits. This example is disclosed in Japanese Patent Unexamined Publication No. H05-227793. PWM control circuit 12 compares carrier signal CA generated by carrier generator 11 with a control signal. Switching elements 15 are PWM-controlled in response to the comparison, thereby driving motor 13.

Figure 16:
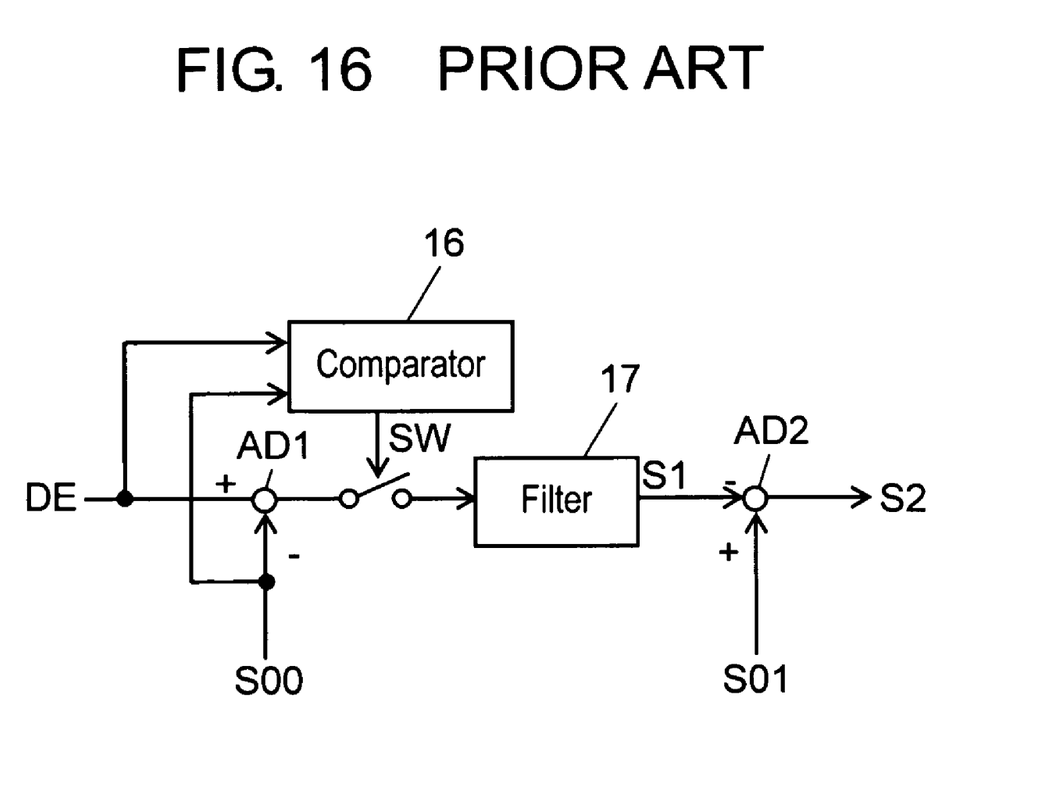
FIG. 16 shows a circuit diagram of an overload detector of the inverter circuit shown in FIG. 15.

Since driving at a higher carrier frequency for reducing magnetic noises increases the heat generated by switching elements 15, appropriate selection of the carrier frequency is required so that the temperature of switching elements 15 can fall within a rated one. In addition to this preparation, a load applied to driving motor 13 is monitored with a current supplied from PWM control circuit 12, and when overload detector 14 detects an overload, the carrier frequency is lowered. In other words, as shown in FIG. 16, comparator 16 compares signal DE indicating a load status with reference signal S00, and when the comparison shows DE>S00, it is determined that the motor is overloaded and switch SW is turned on. A difference between signal DE and reference signal S00 supplied from subtracter AD1 is fed into filter 17 via switch SW. Time constant T1 of filter 17 is set to be T1>T2. T2 is an acceleration or deceleration time of driving motor 13. Adder-subtracter AD2 finds difference S2 between output S1 from filter 17 and predetermined set value S01 indicating a rated load status. The carrier frequency is lowered in response to difference S2.

However, in the first conventional example, since the inverter circuit monitors a rate of temperature rise of the switching elements, a long continuous driving will sometime overheat the switching elements even if the rate of temperature rise is low. In the second conventional example, since only a load applied to the motor is monitored, if a temperature around the switching elements is high, the switching elements will be sometime overheated although the motor is not overloaded.

DISCLOSURE OF INVENTION

An inverter circuit of the present invention comprises the following elements:
a temperature measuring section for measuring a temperature of switching elements constituting a part of a powering section;
a motor speed detector for detecting a speed of a motor;
an output waveform determining circuit for determining a duty in response to a load applied to the motor and for switching a carrier frequency; and
a carrier frequency determiner for outputting the carrier frequency, which is determined based on various control parameters, for example, a temperature of the switching elements measured by the temperature measuring section and a motor speed detected by the motor speed detector, to the output waveform determining circuit.

Monitoring both of a temperature of the switching elements and a speed of the motor will prevent the switching elements from being damaged due to overheating regardless of a loaded status of the motor.

DETAILED DESCRIPTION OF PREFERRED EMBODIMENTS

Exemplary embodiments of the present invention are demonstrated hereinafter with reference to the accompanying drawings. Not to mention, the present invention is not limited to those embodiments.

Exemplary Embodiment 1

Figure 1:
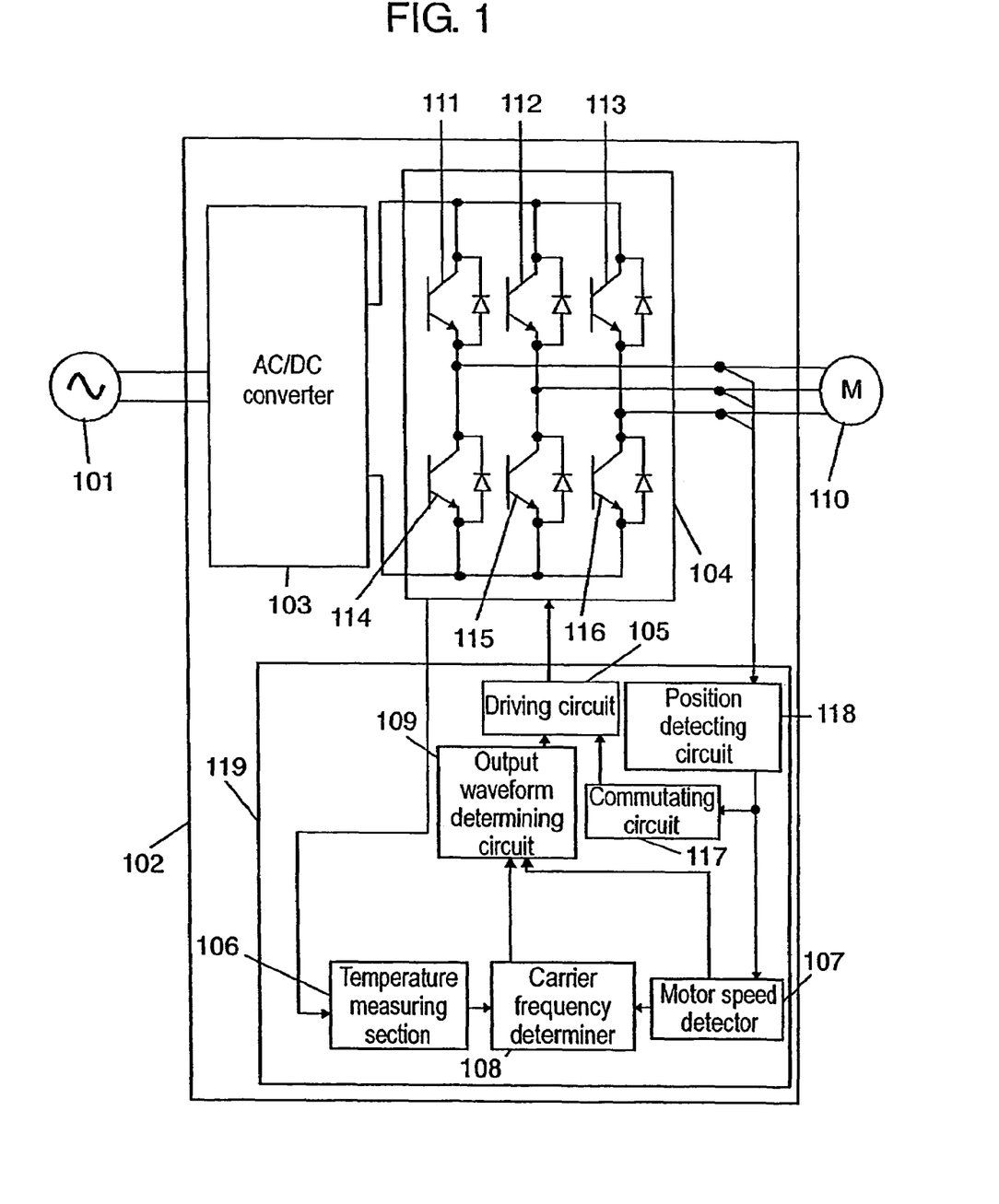
FIG. 1 shows a block diagram of an inverter circuit in accordance with a first exemplary embodiment of the present invention.
Figure 2:
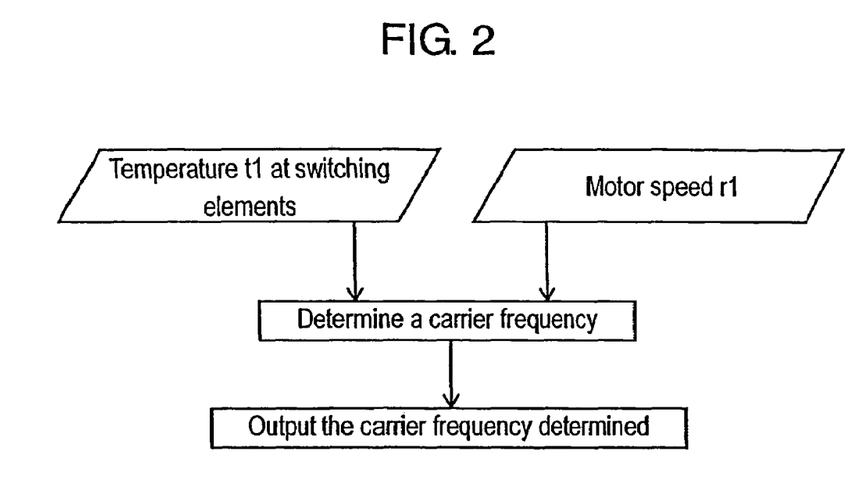
FIG. 2 shows a flowchart illustrating an operation of the inverter circuit shown in FIG. 1.
Figure 3:
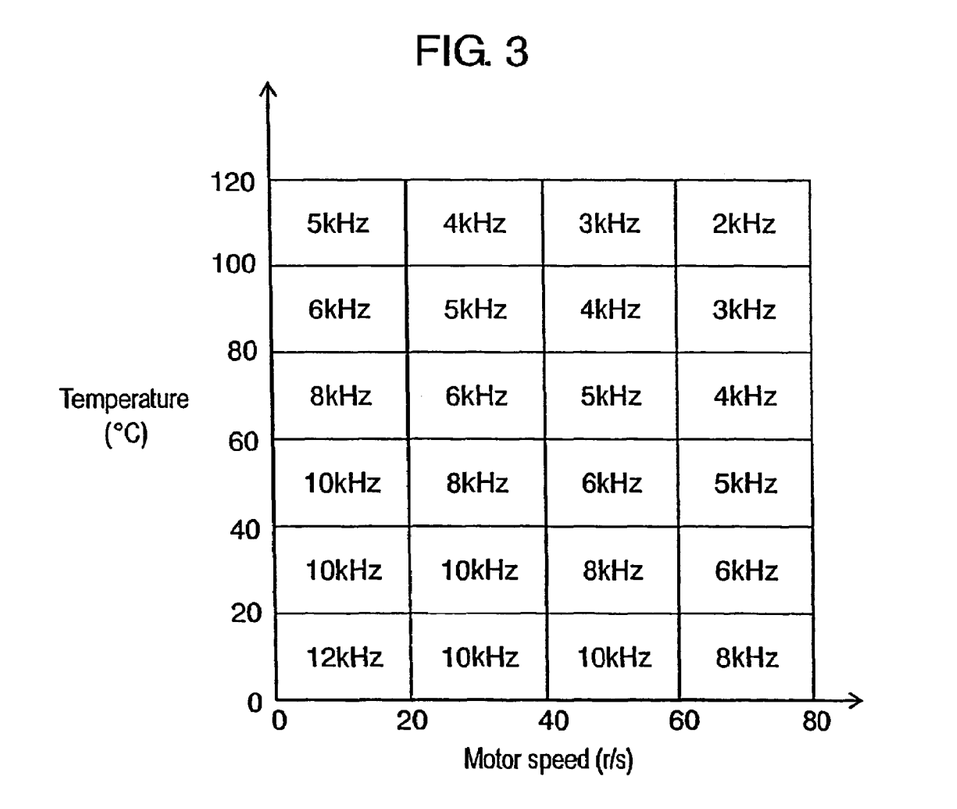
FIG. 3 shows a table listing carrier frequencies of the inverter circuit shown in FIG. 1.

FIG. 1 shows a block diagram of an inverter circuit in accordance with the first exemplary embodiment of the present invention. FIG. 2 shows a flowchart illustrating an operation of the inverter circuit. FIG. 3 shows a table listing carrier frequencies of the inverter circuit in response to temperature of the switching elements and speed of the motor.

In FIG. 1, inverter circuit 102 comprises the following elements:
- AC/DC converter 103 for converting an AC voltage of commercial power source 101 to a DC voltage;
- powering section 104 for driving motor 110; and
- control circuit 119 for controlling the powering section.

Powering section 104 is formed of six IGBT (Insulated Gate-type Bipolar Transistor) switching elements 111, 112, 113, 114, 115, and 116.

Control circuit 119 is formed of driving circuit 105, temperature measuring section 106, motor speed detector 107, carrier frequency determiner 108, output waveform determining circuit 109, commutating circuit 117, and position detecting circuit 118.

Position detecting circuit 118 detects a rotor position by using a back electromotive voltage of motor 110, thereby generating a position detecting signal. Commutating circuit 117 generates a commutating pulse which commutates the switching elements based on an output from position detecting circuit 118. Motor speed detector 107 counts the number of position detecting signals supplied from position detecting circuit 118 for a given period, or measures intervals of the pulses of the position detecting signals for detecting a speed of motor 110. Temperature measuring section 106 measures a temperature of the switching elements with a temperature sensor such as a thermistor. The temperature sensor can be directly mounted to the switching elements, or to a circuit board where the switching elements are mounted, or disposed in a space around the circuit for measuring indirectly a temperature of the switching elements.

Carrier frequency determiner 108 determines a carrier frequency in response to both of a temperature of the switching elements and a speed of motor 110 by using the table shown in FIG. 3, then outputs the carrier frequency determined to output waveform determining circuit 109. Circuit 109 then outputs an increment or a decrement of duty so that a target motor speed can agree with an actual motor speed detected by motor speed detector 107. Circuit 109 also can switch a carrier frequency to the one supplied from the carrier frequency determiner 108. Driving circuit 105 synthesizes a commutating pulse supplied from commutating circuit 117 and a chopping signal supplied from output waveform determining circuit 109, thereby turning on/off the switching elements.

An operation and an action of the inverter circuit discussed above are demonstrated hereinafter.

An AC voltage supplied from commercial power source 101 is converted into a DC voltage by AC/DC converter 103, then a signal supplied from driving circuit 105 works six switching elements 111-116 of powering section 104, and motor 110 is driven by a three-phase AC voltage converted from the DC voltage. A pulse-shaped voltage of the carrier frequency is applied to motor 110. Since a motor current includes harmonics content, motor 110 generates magnetic noises, which could be heard as noises when the carrier frequency is within an audible range; however, the noises decrease at higher carrier frequencies. On the other hand, a higher carrier frequency increases a frequency of switching, so that a switching loss increases. As a result, the switching elements are subjected to a higher possibility of being overheated. It is thus necessary to select a carrier frequency appropriately.

In this first embodiment, as FIG. 2 illustrates, carrier frequency determiner 108 determines a carrier frequency according to the given table and based on temperature t1 at the switching elements measured by measuring section 106 as well as motor speed r1 detected by motor speed detector 107. The carrier frequency determined is supplied from carrier frequency determiner 108 to output waveform determining circuit 109, which then switches a present carrier frequency to the one supplied from carrier frequency determiner 108. Driving circuit 105 operates the switching elements with a driving signal of the switched carrier frequency now available, so that motor 110 is driven.

FIG. 3 shows a table listing carrier frequencies predetermined in response to temperatures of the switching elements and speed of motor 110. In order to reduce magnetic noise, a carrier frequency is set at a level as high as possible. On the other hand, in order to prevent the switching elements from being overheated, the carrier frequency is set at a lower level as a temperature of the switching elements becomes higher. A greater current runs through the switching elements at higher speed of motor 110, so that the switching elements generate greater heat. As a result, the carrier frequency is set at a lower level at a higher motor speed.

As discussed above, the motor is driven at a highest possible carrier frequency in response to the temperature of the switching elements and the speed of the motor, thereby reducing the magnetic noise of the motor. In addition to this condition, monitoring both of the temperature of the switching elements and the speed of the motor allows controlling the carrier frequency, thereby preventing an overheat of the switching elements.

Exemplary Embodiment 2

Figure 4:
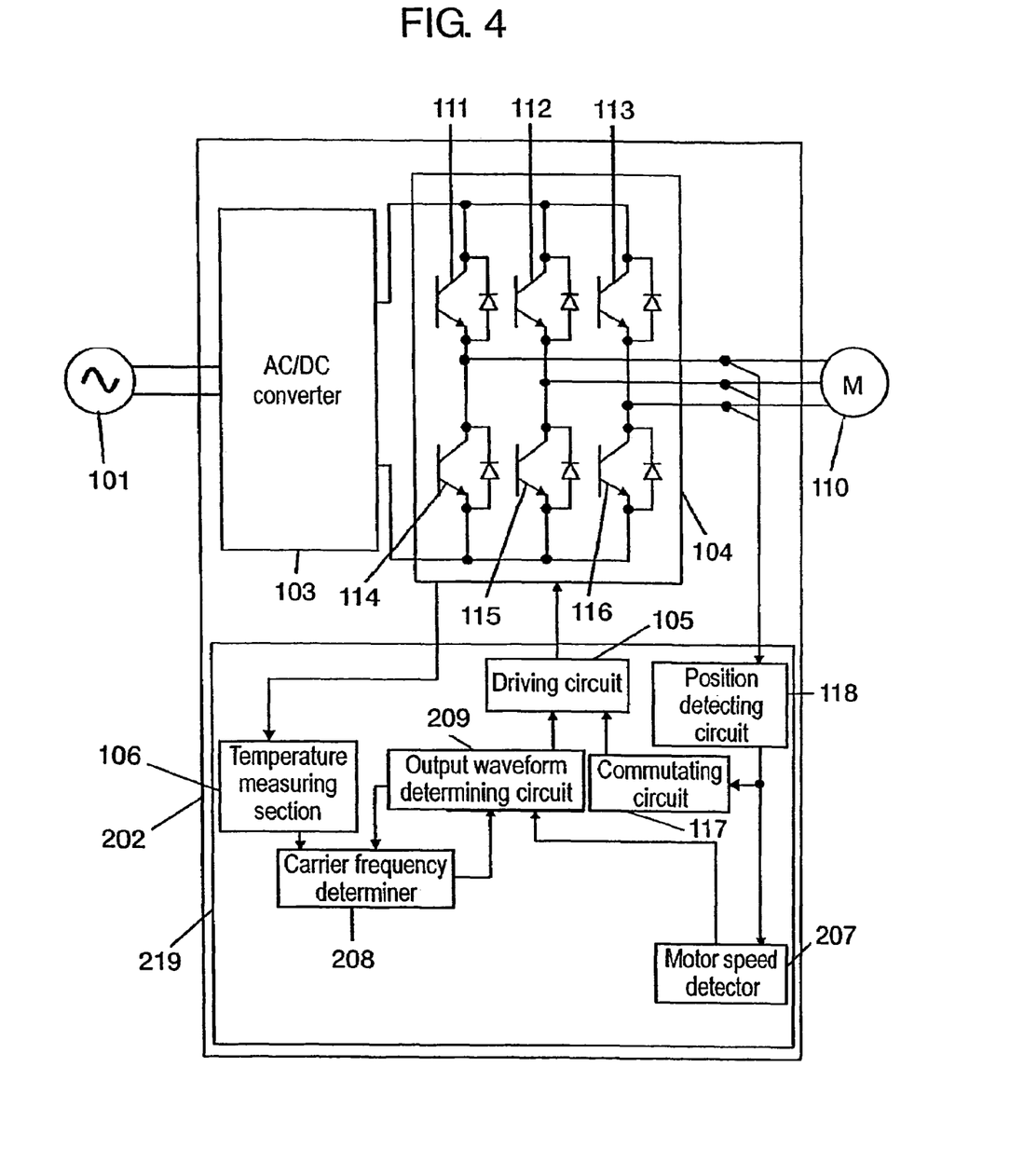
FIG. 4 shows a block diagram of an inverter circuit in accordance with a second exemplary embodiment of the present invention.
Figure 5:
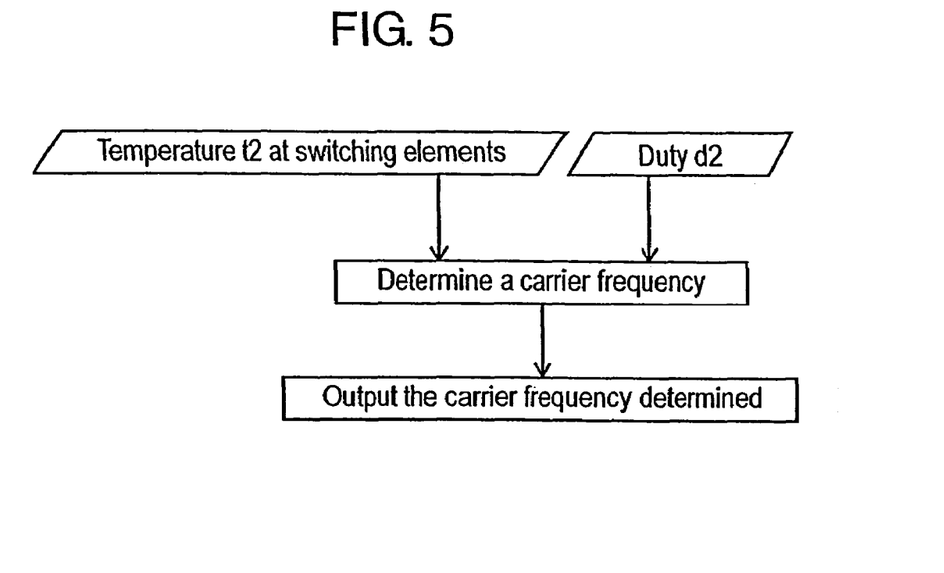
FIG. 5 shows a flowchart illustrating an operation of the inverter circuit shown in FIG. 4.
Figure 6:
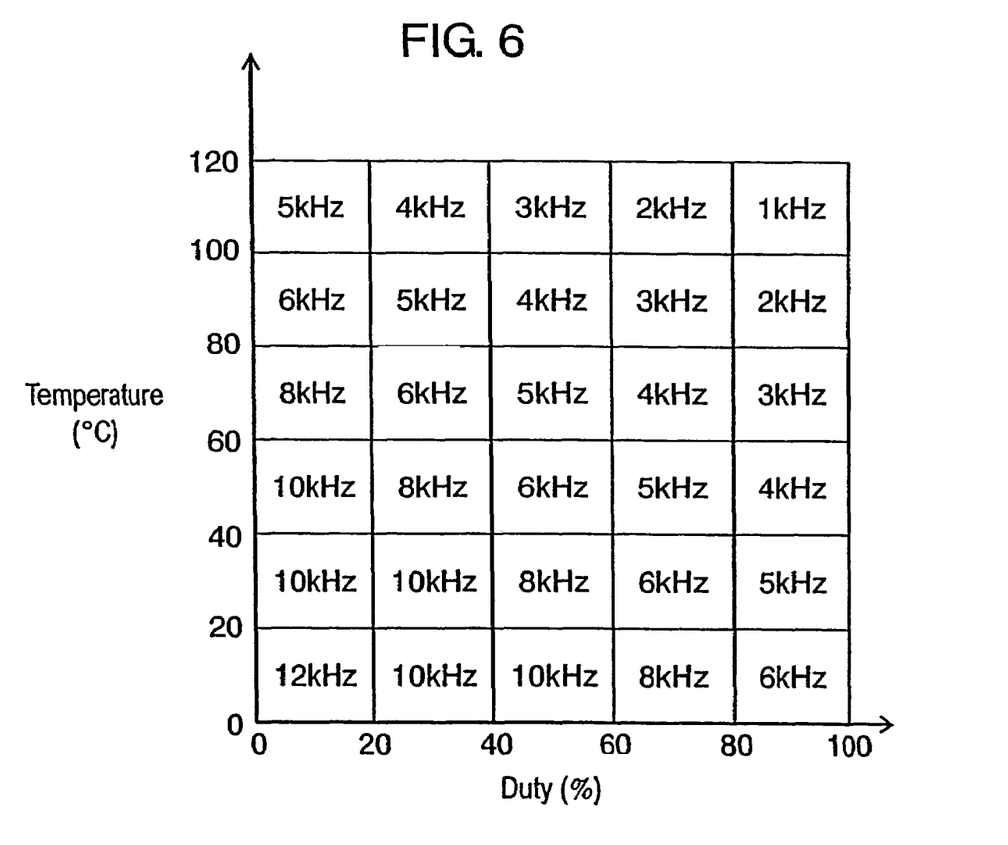
FIG. 6 shows a table listing carrier frequencies of the inverter circuit shown in FIG. 4.

FIG. 4 shows a block diagram of an inverter circuit in accordance with the second exemplary embodiment of the present invention. FIG. 5 shows a flowchart illustrating an operation of the inverter circuit. FIG. 6 shows a table listing carrier frequencies in response to temperatures and duties of switching elements. Elements similar to those in the first embodiment have the same reference marks, and detailed descriptions thereof are omitted here.

In FIG. 4, inverter circuit 202 comprises the following elements:
- AC/DC converter 103 for converting an AC voltage of commercial power source 101 to a DC voltage;
- powering section 104 for driving motor 110; and
- control circuit 219 for controlling the powering section.

Control circuit 219 is formed of driving circuit 105, temperature measuring section 106, motor speed detector 207, carrier frequency determiner 208, output waveform determining circuit 209, commutating circuit 117, and position detecting circuit 118.

Motor speed detector 207 counts the number of position detecting signals supplied from position detecting circuit 118 for a given period, or measures intervals of the pulses of the position detecting signals for detecting a speed of motor 110. Carrier frequency determiner 208 determines a carrier frequency in response to both of the temperature of six switching elements 111-116 measured by temperature measuring section 106 and a duty obtained by output waveform determining circuit 209 by using the table shown in FIG. 6. Output waveform determining circuit 209 then outputs an increment or a decrement of duty so that a target motor speed can agree with an actual motor speed detected by motor speed detector 207, and outputs an actual duty to carrier frequency determiner 208. Circuit 109 also can switch a carrier frequency to the one supplied from carrier frequency determiner 208.

An operation and an action of the inverter circuit discussed above are demonstrated hereinafter.

An AC voltage supplied from commercial power source 101 is converted into a DC voltage by AC/DC converter 103, then a signal supplied from driving circuit 105 works six switching elements 111-116 of powering section 104, and a three-phase AC voltage converted from the DC voltage drives motor 110.

A pulse-shaped voltage of the carrier frequency is applied to motor 110. Since a motor current includes harmonics content, motor 110 generates magnetic noises, which could be heard as noises when the carrier frequency is within an audible range; however, the noises decrease at higher carrier frequencies. On the other hand, a higher carrier frequency increases a frequency of switching, so that a switching loss increases. As a result, the switching elements are subjected to a higher possibility of being overheated. It is thus necessary to select a carrier frequency appropriately.

In this second embodiment, as FIG. 5 illustrates, carrier frequency determiner 208 determines a carrier frequency according to the given table and based on temperature t2 at the switching elements measured by measuring section 106 as well as duty d2 supplied from carrier frequency determiner 208. The carrier frequency determined is supplied from carrier frequency determiner 208 to output waveform determining circuit 209, which then switches a present carrier frequency to the one supplied from carrier frequency determiner 208. Driving circuit 105 operates the switching elements with a driving signal of the switched carrier frequency now available, so that motor 110 is driven.

FIG. 6 shows a table listing carrier frequencies predetermined in response to both of temperatures and duties of the switching elements. In order to reduce magnetic noise, a carrier frequency is set at a level as high as possible. On the other hand, in order to prevent the switching elements from being overheated, the carrier frequency is set at a lower level as a temperature of the switching elements becomes higher. At the same temperature of the switching elements, a greater current runs through the switching elements at higher duties of the switching elements because of a longer ON period, so that the switching elements generate greater heat. As a result, the carrier frequency is set at a lower level as a duty becomes higher.

As discussed above, the motor is driven at a highest possible carrier frequency in response to the temperature and the duty of the switching elements, thereby reducing the magnetic noise of the motor. In addition to this condition, monitoring both of the temperature and the duty of the switching elements allows controlling the carrier frequency, thereby preventing an overheat of the switching elements.

Exemplary Embodiment 3

Figure 7:
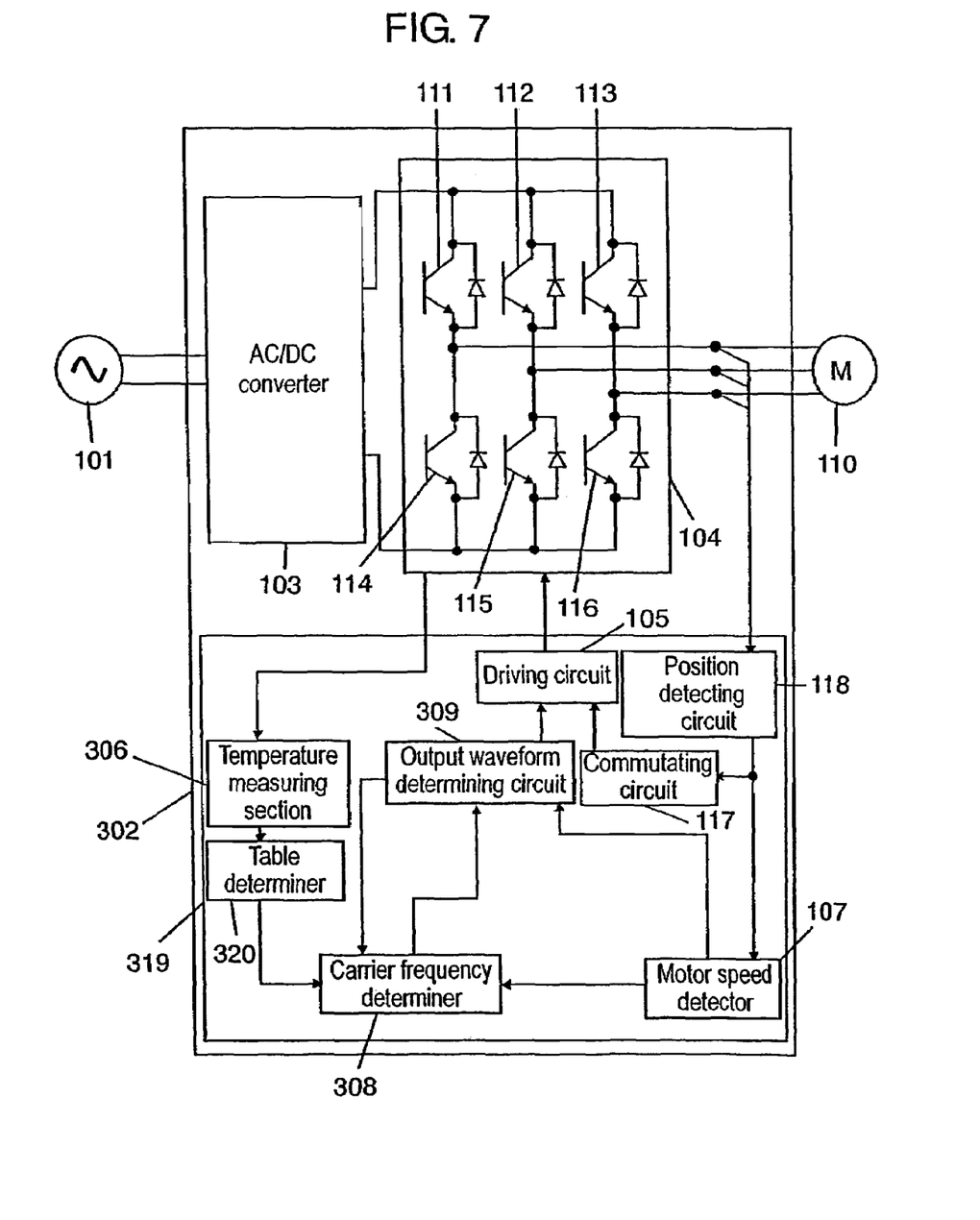
FIG. 7 shows a block diagram of an inverter circuit in accordance with a third exemplary embodiment of the present invention.
Figure 8:
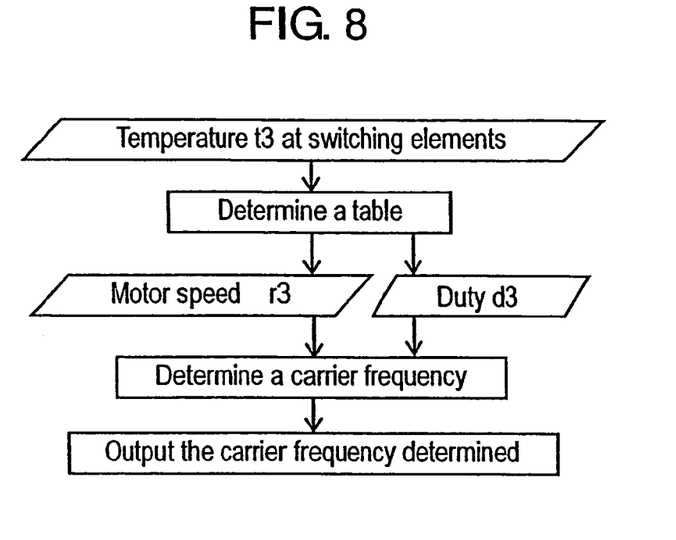
FIG. 8 shows a flowchart illustrating an operation of the inverter circuit shown in FIG. 7.
Figure 9:
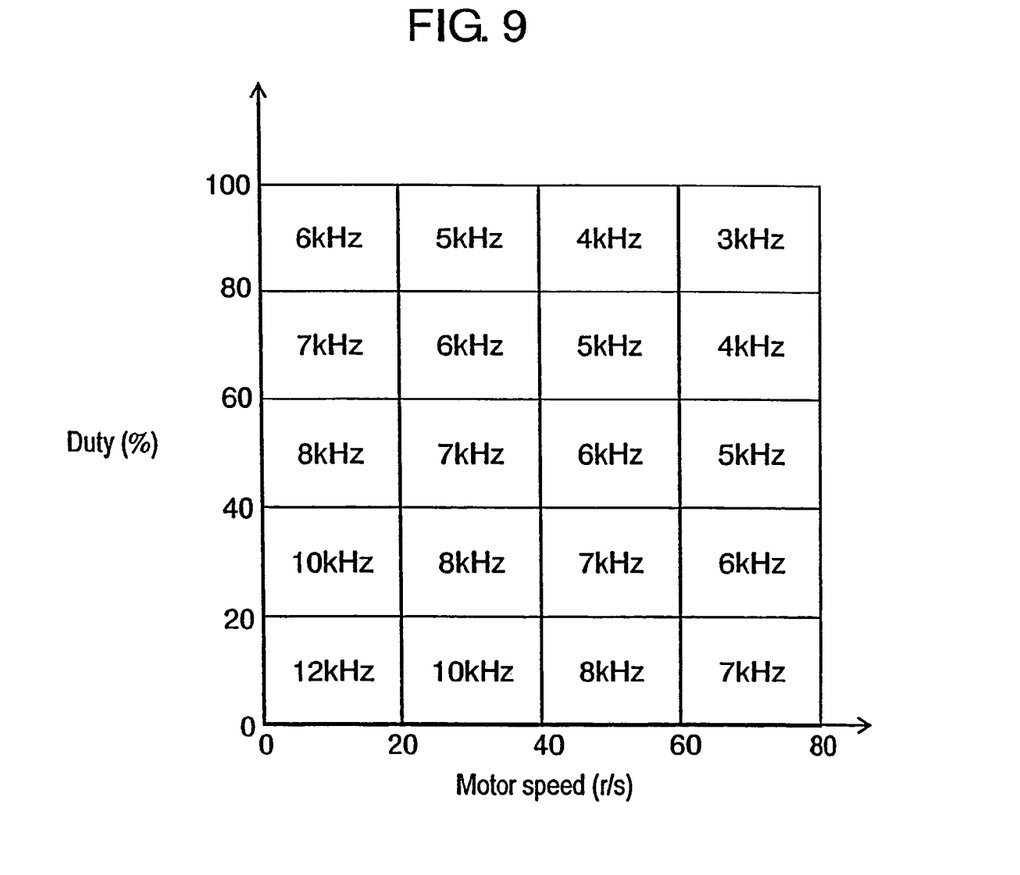
FIG. 9 shows a table listing carrier frequencies of the inverter circuit shown in FIG. 7.
Figure 10:
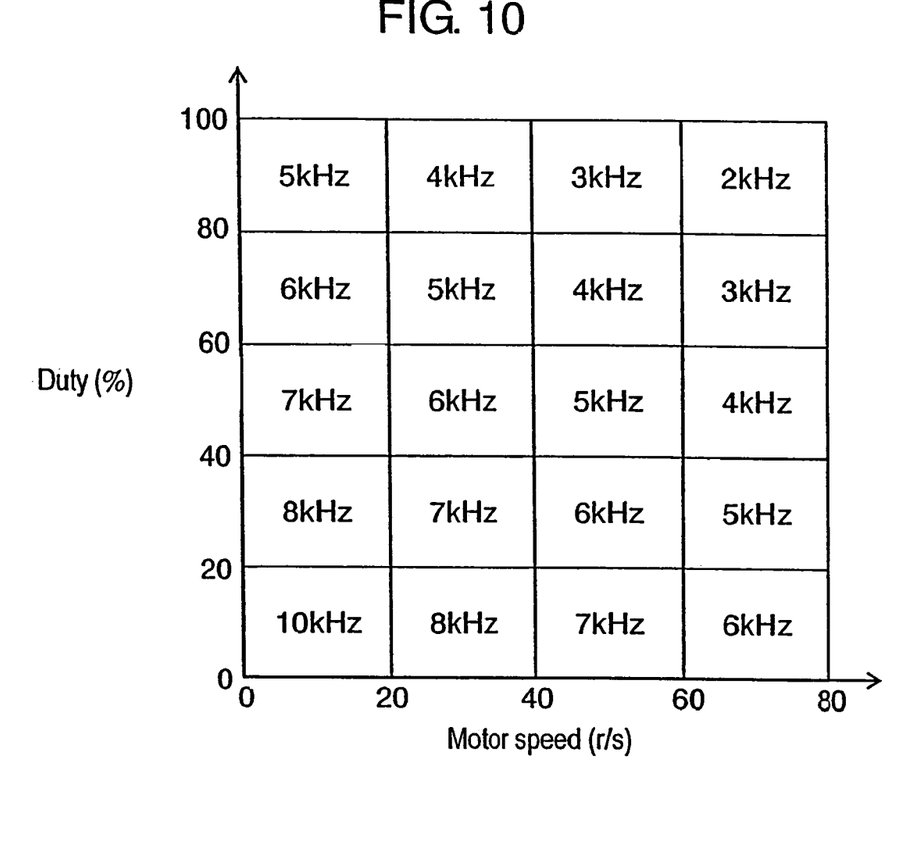
FIG. 10 shows another table listing carrier frequencies of the inverter circuit shown in FIG. 7.

FIG. 7 shows a block diagram of an inverter circuit in accordance with the third exemplary embodiment of the present invention. FIG. 8 shows a flowchart illustrating an operation of the inverter circuit. FIG. 9 shows a table listing carrier frequencies in response to both of the motor speed at a temperature ranging from t4 to t5 of switching elements and duties of the switching elements. FIG. 10 shows a table listing carrier frequencies in response to both of the motor speed at a temperature ranging from t6 to t7 of the switching elements and duties of the switching elements. Elements similar to those in the first embodiment have the same reference marks, and detailed descriptions thereof are omitted here.

In FIG. 7, inverter circuit 302 comprises the following elements:

AC/DC converter 103 for converting an AC voltage of commercial power source 101 to a DC voltage;
powering section 104 for driving motor 110; and
control circuit 319 for controlling the powering section.

Control circuit 319 is formed of driving circuit 105, temperature measuring section 306, motor speed detector 107, output waveform determining circuit 309, commutating circuit 117, position detecting circuit 118, carrier frequency determiner 308, and table determiner 320.

Temperature measuring section 306 measures a temperature of six switching elements 111-116 of powering-section 104 with a temperature sensor such as a thermistor. Output waveform determining circuit 309 outputs an increment or a decrement of a duty so that a target motor speed can agree with an actual motor speed detected by motor speed detector 107, and outputs an actual duty to carrier frequency determiner 308. Output waveform determining circuit 309 also can switch a carrier frequency to the one supplied from carrier frequency determiner 308.

As shown in FIG. 8, in response to temperature t3 of the switching elements measured by temperature measuring section 306, table determiner 320 determines which table is to be used from the tables shown in FIG. 9 and FIG. 10 listing given carrier frequencies. Using the table determined by table determiner 320, carrier frequency determiner 308 determines a carrier frequency in response to both of duty d3 supplied from output waveform determining circuit 309 and motor speed r3 detected by motor speed detector 107.

An operation and an action of the inverter circuit discussed above are demonstrated hereinafter.

An AC voltage supplied from commercial power source 101 is converted into a DC voltage by AC/DC converter 103, then a signal supplied from driving circuit 105 works six switching elements 111-116 of powering section 104, and a three-phase AC voltage converted from the DC voltage drives motor 110.

FIG. 9 shows a table listing carrier frequencies in response to both of the motor speed at a temperature ranging from t4 to t5 of the switching elements and duty of the switching elements. FIG. 10 shows a table listing carrier frequencies in response to both of the motor speed at a temperature ranging from t6 to t7 of the switching elements and duties of the switching elements. The optimal carrier frequency is set in response to a temperature, a duty of the switching elements, and a speed of the motor.

In the foregoing discussion, the condition of t4<t5<t6<t7 is satisfied. Table determiner 320 determines using the table in FIG. 9 when the temperature of the switching elements is from t4 to t5, and using the table shown in FIG. 10 when the temperature thereof is from t6 to t7. Carrier frequency determiner 308 determines a carrier frequency according to the table shown in FIG. 9 or 10, then outputs the carrier frequency determined to output waveform determining circuit 309, which then switches a present carrier frequency to the one supplied from carrier frequency determiner 308. Driving circuit 105 operates the switching elements with a driving signal of the switched carrier frequency now available, so that motor 110 is driven. A pulse-shaped voltage of the carrier frequency is applied to motor 110. Since a motor current includes harmonics content, motor 110 generates magnetic noises. However, the noises can be reduced by raising the carrier frequency. On the other hand, a higher carrier frequency increases a frequency of switching, so that a switching loss increases. As a result, the switching elements are subjected to a higher possibility of being overheated. It is thus necessary to select a carrier frequency appropriately.

In the tables shown in FIGS. 9 and 10, carrier frequencies are set at the highest possible levels in order to reduce magnetic noises. On the other hand, a lower carrier frequency is set at greater speed of motor 110 in order to prevent an overheat of the switching elements. At the same speed of motor 110, a greater current runs through the switching elements at higher duties of the switching elements because of a longer ON period. As a result, in order to prevent an overheat of the switching elements, the carrier frequency is set at a lower level as a duty becomes higher at the same motor speed.

Comparison of FIG. 9 with FIG. 10 tells that the table in FIG. 10, which covers higher temperatures of the switching elements, prepares carrier frequencies at a lower level in general. Since the table in FIG. 10 covers the higher temperatures of the switching elements, the switching elements have smaller allowance to the critical temperature, so that the carrier frequency is set at a lower level in order to suppress a temperature rise of the switching elements.

As discussed above, the motor is driven at a highest possible carrier frequency in response to the temperature and the duty of the switching elements, thereby reducing the magnetic noise of the motor. In addition to this condition, monitoring both of the temperature and the duty of the switching elements allows controlling the carrier frequency, thereby preventing an overheat of the switching elements. Further, since three parameters, i.e. temperature of the switching elements, speed of the motor, and duty, are set for determining a carrier frequency, the highest possible frequency can be selected in response to both of the temperature of the switching elements and a load status of the motor.

In the case of raising a carrier frequency for reducing noises, assume that there are two cases, e.g. the switching elements stand at 50° C. and 60° C., the elements standing at 50° C. have a greater allowance to the critical temperature than that at 60° C., so that a higher carrier frequency can be used. However, in the case of 60° C., a speed of the motor is raised and the duty is lowered, thereby suppressing heat generation from the switching elements, so that the motor can be driven at a higher carrier frequency. As discussed above, when the switching elements stand at a high temperature, use of the carrier frequency tables can be switched from one table to another one at respective temperatures of the switching elements allows using a higher carrier frequency by controlling a speed of the motor and a duty, so that noises can be reduced.

Exemplary Embodiment 4

Figure 11:
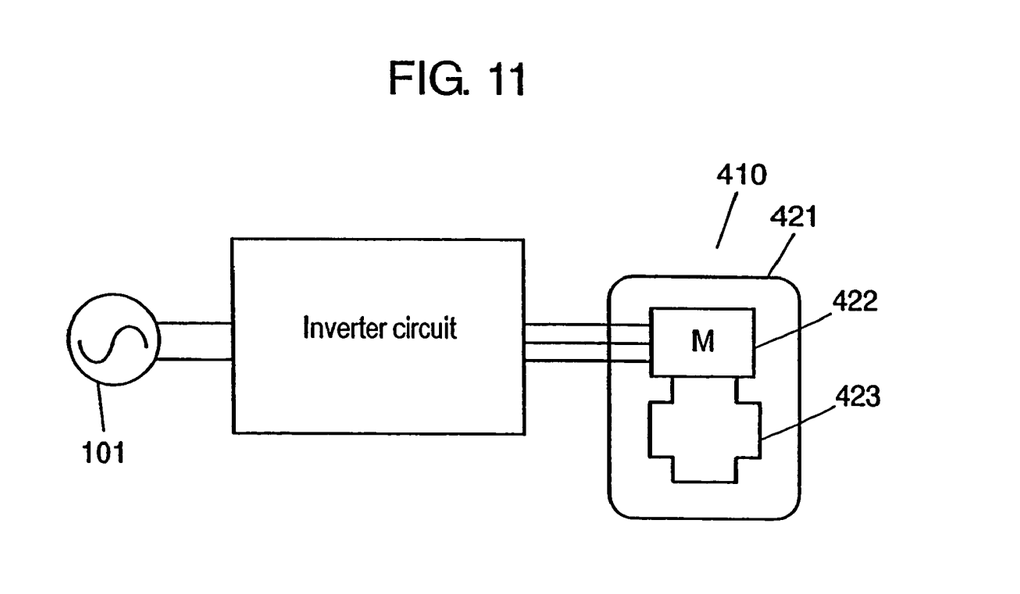
FIG. 11 shows a block diagram illustrating a method of driving a compressor in accordance with a fourth exemplary embodiment of the present invention.

FIG. 11 shows a block diagram illustrating a method of driving a compressor in accordance with the fourth exemplary embodiment of the present invention. In FIG. 11, the inverter circuit is the ones used in the first, second, or third embodiment, and coupled to commercial power source 101 for driving compressor 410.

Compressor 410 comprises hermetic container 421, motor element 422 formed of a stator and a rotor disposed in hermetic container 421, and compressor element 423 disposed in hermetic container 421. This structure prevents switching elements from being overheated, and allows selecting the highest possible carrier frequency in response to a temperature of the switching elements and a load applied to the motor. The compressor is thus expected to be reliable and produce fewer noises.

INDUSTRIAL APPLICABILITY

The inverter circuit and the compressor of the present invention can prevent the switching elements from being overheated, so that the circuit is useful to drivers of compressors, in particular, it is useful to drivers of electric hermetic compressors used in refrigerators.

The invention claimed is:

1. An inverter circuit comprising:
    a temperature measuring section for measuring a temperature of switching elements forming a powering section;
    a motor speed detector for detecting a speed of a motor;
    an output waveform determining circuit for determining a duty in response to a load applied to the motor and for switching a carrier frequency;
    a carrier frequency determiner for outputting the carrier frequency, which is determined based on various control parameters, to the output waveform determining circuit;
    wherein the carrier frequency determiner outputs a carrier frequency, which is determined based on a temperature measured at the switching elements by the temperature measuring section and a duty of the switching elements, to the output waveform determining circuit; and
    wherein the carrier frequency is raised according to the decrement of the duty.

2. The inverter circuit of claim 1, wherein the carrier frequency determiner outputs a carrier frequency, which is determined based on a temperature measured at the switching elements by the temperature measuring section and a duty of the switching elements, to the output waveform determining circuit.

3. The inverter circuit of claim 1, wherein the carrier frequency determiner outputs a carrier frequency, which is determined based on a temperature measured at the switching elements by the temperature measuring section, a speed of the motor detected by the motor speed detector, and a duty of the switching elements, to the output waveform determining circuit.

4. A compressor including the inverter circuit as defined in claim 1.

5. A compressor including the inverter circuit as defined in claim 1.

6. A compressor including the inverter circuit as defined in claim 2.

7. A compressor including the inverter circuit as defined in claim 3.

8. An inverter circuit comprising:
    a temperature measuring section for measuring a temperature of switching elements forming a powering section;
    a motor speed detector for detecting a speed of a motor;
    an output waveform determining circuit for determining a duty in response to a load applied to the motor and for switching a carrier frequency;
    a carrier frequency determiner for outputting the carrier frequency, which is determined based on various control parameters, to the output waveform determining circuit;
    wherein the carrier frequency determiner outputs a carrier frequency, which is determined based on a temperature measured at the switching elements by the temperature measuring section, a speed of the motor detected by the motor speed detector, and a duty of the switching elements, to the output waveform determining circuit; and
    wherein the carrier frequency is raised according to the decrement of the duty.

9. A compressor including the inverter circuit as defined in claim 8.

* * * * *